Patented May 3, 1949

2,469,344

UNITED STATES PATENT OFFICE 2,469,344

HOMOGENEOUS GASEOUS PHASE CATALYTIC ALKYLATION OF ISOBUTANE WITH CYCLOPROPANE

William A. Stover, Woodbury, N. J., assignor to Socony-Vacuum Oil Company, Incorporated, a corporation of New York No Drawing. Application December 20, 1946, Serial No. 717,609

10 Claims. (Cl. 260—683.4)

This invention relates generally, to the alkylation of paraffinic hydrocarbons with cycloparaffins, and is more particularly concerned with the production of high-octane motor fuels by the catalytic alkylation of isobutane with cyclopropane.

It is well known in the art to combine paraffinic hydrocarbons directly with olefinic hydrocarbons by processes broadly called alkylation processes to produce motor fuels having constituents of saturated character. In alkylation processes, a charge comprising a mixture of an alkylatable paraffinic hydrocarbon, as a general rule, a paraffinic hydrocarbon other than methane and ethane, called the paraffinic reactant, and an olefinic hydrocarbon, called the olefinic reactant or alkylating agent, is subjected to high temperature and pressure to produce a saturated alkylate product. Since conditions of alkylation also cause polymerization of the olefinic reactant, it is necessary to maintain a relatively low concentration of the olefinic reactant in the charge. The only limit to the pressure used appears to be the feasibility of maintaining high pressures. On the other hand, the temperature used is limited by degradation of the hydrocarbon reactants in the charge to low molecular weight hydrocarbons and the occurrence of side reactions, including polymerization of the olefinic reactant, under high temperature conditions, that substantially reduce the purity of the product obtained.

The temperatures and to a certain extent, the pressures employed in alkylation operations depend upon whether the alkylation is effected in the absence or presence of alkylation catalysts. The two methods are generally referred to as thermal and catalytic alkylation, respectively. As is well known in the art, thermal alkylation ordinarily involves the use of temperatures of at least about 950° F. and pressures of the order of 4000 pounds per square inch or higher. At these temperatures, the degradation of the hydrocarbon reactants in the charge and the occurrence of side reactions, including polymerization of the olefinic reactant, are somewhat marked. On the other hand, catalytic alkylation involves the use of appreciably lower temperatures, thereby assuring a high yield of desired alkylate by avoiding extensive degradation of the reactants, the occurrence of secondary reactions, and appreciable polymerization of the olefinic reactant.

Several methods are known for the catalytic alkylation of isoparaffinic hydrocarbons with olefinic hydrocarbons. For instance, it is known to alkylate isoparaffinic hydrocarbons with olefinic hydrocarbons in the presence of sulfuric acid, phosphoric acid, metal phosphates, metal halides, activated clays, and the like, as catalysts. In these catalytic alkylation processes, the hydrocarbon reactants form with the alkylation catalysts a heterogeneous system during the alkylation operation. Hence, these alkylation catalysts may be termed heterogeneous alkylation catalysts. Since under alkylation conditions the catalytic activity of the alkylation catalysts appears to be predicated upon contact between the catalysts and the gaseous hydrocarbon reactants at the interfaces therebetween, in these processes, the catalysts are used in amounts varying between 10% and 200% by weight, on the charge, depending on the catalyst used. Due to these comparatively high amounts, where possible, recovery and regeneration of the catalysts have been proposed. This, of course, involves high initial and operation costs. Further, it is also known that certain substances called promoters, promote the catalytic activity of these alkylation catalysts. Accordingly, several processes have been proposed wherein small amounts of these promoters, on the order of about 1% to 3% by weight on the charge, are added to the catalysts to promote their alkylation catalytic activity.

Copending applications, Serial Number 502,018, filed September 11, 1943, now Patent No. 2,410,107; Serial Number 502,812, filed September 17, 1943, now Patent No. 2,410,071; Serial Number 508,062, filed October 28, 1943, now Patent No. 2,406,776; Serial Number 513,720, filed December 10, 1943, now Patent No. 2,407,033; and Serial Number 554,342, filed September 15, 1944, now Patent No. 2,410,108, are directed to the process of alkylating normal paraffinic or isoparaffinic hydrocarbons with olefinic hydrocarbons, which comprises contacting a normal paraffinic or isoparaffinic hydrocarbon and an olefinic hydrocarbon in a reaction zone under alkylating conditions, with small or promoter amounts of what has been termed therein, a homogeneous gaseous phase alkylation catalyst which consists essentially of a material that forms with the hydrocarbon reactants a single, homogeneous gaseous phase under the alkylation conditions of the reaction zone.

The homogeneous gaseous phase alkylation catalysts disclosed in the copending applications referred to hereinbefore are organic halogen compounds, organic nitro compounds, and organic cyclic oxygen compounds wherein oxygen is part of the ring, which forms with the hydrocarbon reactants, a single, homogeneous gaseous phase under the alkylation conditions of the reaction zone, chlorine and bromine. Chloroform, chlorinated naphtha, chlorinated butane, carbon tetrachloride, ethylene dibromide, propylene dibromide, dibromoisobutane, ethyl bromide, propylene tribromide, tertiary monobromobutane, methyl chloroacetate, chloral, acetyl bromide, dibromoethyl ether, trifluoroacetic acid, isopropyl fluoride, diiodoethyl ether, isobutyl iodide, iodoform, dibromomonoiodo methane, fluorocyclopropane, bromocyclobutane, iodocyclobutane, p-dibromobenzene, benzyl iodide, benzoyl fluoride, nitromethane, nitropropane, nitrobenzene, 1-nitro-1-chloropropane, furfural, ethylene oxide, and propylene oxide are among the specific substances mentioned as suitable homogeneous, gaseous phase alkylation catalysts for the alkylation processes disclosed in these copending applications.

The foregoing copending applications, with the exception of application Serial Number 502,018, filed September 11, 1943, now Patent No. 2,410,107, and still another copending application, Serial Number 502,813, filed September 17, 1943, now Patent No. 2,410,072, are also directed to the process of alkylating isobutane with propylene which comprises contacting isobutane and propylene in a reaction zone under controlled alkylating conditions, with promoter or small amounts of the homogeneous gaseous phase alkylation catalysts broadly disclosed in the copending applications referred to hereinbefore. In the alkylation of isobutane with propylene in the presence of homogeneous gaseous phase alkylation catalysts, it was found that the alkylate obtained included constituents which are entirely different from the constituents of the hydrocarbon alkylate obtained in the alkylation of isobutane with propylene in the presence of known heterogeneous alkylation catalysts, i. e., aluminum chloride, sulfuric acid, and the like. Thus, when heterogenous alkylation catalysts are used, 2,3-dimethylpentane and 2,4-dimethylpentane are important constituents of the hydrocarbon alkylate obtained. On the other hand, when homogeneous gaseous phase alkylation catalysts are employed, triptane or 2,2,3-trimethylbutane, 2,2-dimethylpentane, and 2-methylhexane are the predominant constituents of the hydrocarbon alkylate. In these copending applications, the formation of these three compounds was postulated as follows:

*Isobutane propylene*

1.
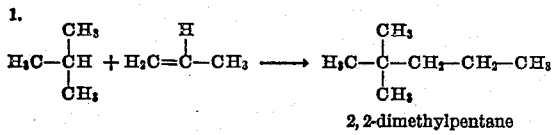
2,2-dimethylpentane

2.
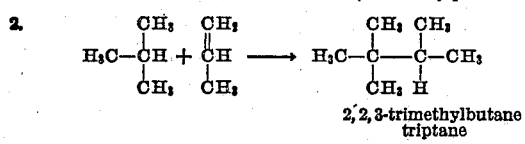
2,2,3-trimethylbutane
triptane

3.
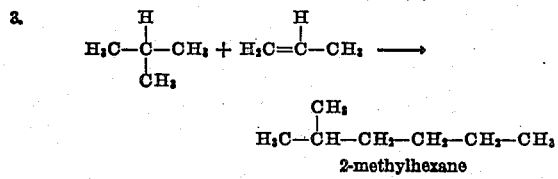
2-methylhexane

The 2,2-dimethylpentane produced by the first reaction has an octane number of about 80 CFR motor method; the triptane produced by the second reaction has an octane number of well over 100; and the 2-methylhexane obtained in the third reaction has an octane number of about 45. In view of the foregoing, in the manufacture of high-octane motor fuels by the alkylation of isobutane with propylene, alkylation conditions which favor the production of triptane obviously are preferable. It was also found that in actual practice, it was impossible to obtain a triptane fraction containing triptane exclusively, appreciable amounts of 2,2-dimethylpentane and small amounts of 2-methylhexane being always present.

I have now discovered a method whereby the triptane-containing fractions obtained in the homogeneous gaseous phase alkylation of isobutane contain proportions of triptane which are appreciably greater than those obtained in accordance with the processes set forth in the copending applications referred to hereinbefore.

I have found that isobutane can be alkylated with cyclopropane in the presence of a homogeneous, gaseous phase alkylation catalyst, and that the triptane-containing fractions thus obtained contain proportions of triptane which are greater than those obtained when propylene is used as the alkylating agent.

Accordingly, it is an object of the present invention to provide a process for alkylating paraffinic hydrocarbons with cycloparaffins. Another object is to provide a process for alkylating paraffinic hydrocarbons with cycloparaffins in the presence of homogeneous gaseous phase alkylation catalysts. A further object is to afford a process for the production of high yields of high-octane gasoline. An important object is to provide an efficient process for manufacturing triptane. A more specific object is to provide an improved catalytic process for manufacturing triptane through the use of homogeneous gaseous phase alkylation catalysts. Other objects and advantages of the present invention will become apparent to those skilled in the art from the following description.

Broadly stated, my invention provides a process for alkylating paraffinic hydrocarbons with cycloparaffins, which comprises contacting a paraffinic hydrocarbon, more particularly, isobutane, with a cycloparaffin, more particularly, cyclopropane, in gaseous phase and under alkylating conditions, in the presence of a homogeneous gaseous phase alkylation catalyst.

An important feature of the process of the present invention is the relatively low temperature that may be used. As a result, degradation of the hydrocarbon reactants in the charge to low molecular weight hydrocarbons and the pronounced occurrence of side reactions are substantially completely avoided. Consequently, in my process, I obtain high yields of a high grade product which is almost entirely paraffinic in nature and substantially free from impurities.

As stated hereinbefore, the catalysts to be used in my process are organic nitro compounds, organic halogen compounds, and organic cyclic compounds wherein oxygen is part of the ring, which form with the hydrocarbon reactants a single, homogeneous, gaseous phase under the alkylating conditions of the reaction zone, and chlorine and bromine. I prefer to use organic chlorine and bromine compounds, and especially the chlorine and bromine derivatives of acyclic, alicyclic and aromatic hydrocarbons, particularly the cheap and readily available low-boiling hydrocarbons, from methane up to hydrocarbons having ten carbon atoms per molecule, wherein chlorine and/or bromine have been substituted for part or all of the hydrogen of a hydrocarbon, or into a non-ring portion, if any, of the hydrocarbon. Of these, the bromine derivatives of low-boiling acyclic hydrocarbons, especially the tertiary bromine derivatives of low-boiling acyclic hydrocarbons are the most desirable catalysts. In the interest of brevity, the catalysts operative in the process of the present invention are referred to herein and in the claims as homogeneous, gaseous phase alkylation catalysts, it being clearly understood that when I speak of a homogeneous, gaseous phase alkylation catalyst, I have reference to organic halogen compounds, organic nitro compounds, organic cyclic oxygen compounds wherein oxygen is part of the ring, which form with the hydrocarbon reactants, a single, homogeneous, gaseous phase under the alkylating conditions of the reaction zone, and chlorine and bromine.

Therefore, a very important feature of the present invention is the fact that, contrary to known catalytic alkylation processes of the prior art in which the hydrocarbon reactants being processed form with the alkylation catalysts a heterogeneous system during the alkylation operation, the alkylation process of my invention employs an alkylation catalyst which forms with the hydrocarbon reactants being processed a single, homogeneous, gaseous phase under the alkylating conditions of the reaction zone. The alkylation catalysts used herein are called, therefore, and as noted hereinbefore, homogeneous, gaseous phase alkylation catalysts, in contradistinction to the alkylation catalysts of the prior art which are referred to as heterogeneous alkylation catalysts. Accordingly, as a result of the catalyst's being in the same phase or state as the hydrocarbon reactants being processed, fouling of the catalyst is substantially eliminated and agitation and/or mixing problems are non-extant. Moreover, since the catalytic activity of alkylation catalysts appears to be predicated somewhat upon contact between the catalysts and the hydrocarbon reactants at the interfaces therebetween, it follows that the catalytic efficiency of a given catalyst increases with the increase in area of interfacial contact, other variables remaining constant. Hence, since the homogeneous, gaseous phase alkylation catalysts of my process inherently furnish the greatest possible "interfacial contact" between the catalyst and the hydrocarbon reactants under the conditions of operation, efficient catalytic activity with concomitant high yields of high grade alkylates are possible, even though relatively small amounts of homogeneous, gaseous phase alkylation catalyst are employed.

In view of the foregoing, an operation feature of the process of the present invention that is of considerable practical importance, is that relatively small amounts of catalyst may be used. These amounts are so small that they may be discarded, thereby eliminating recovery and regeneration problems with consequent reduction of initial and operation costs. Thus, I ordinarily employ the homogeneous, gaseous phase alkylation catalysts in amounts varying between about 0.5% and about 3%, and preferably, in amounts varying between about 1% and about 1.5%, based on the weight of the hydrocarbon reactants. It must be clearly understood, however, that greater amounts may be used if desired, although no advantages appear to result therefrom.

The alkylating conditions of my process include temperatures varying between about 700° F. and about 940° F., and preferably, temperatures varying between about 800° F. and about 850° F. Under appreciably higher temperature conditions, secondary reactions occur that substantially reduce the purity of the product obtained. The pressure may vary from about 500 pounds per square inch up to about 6000 pounds per square inch or more, and preferably, from about 2500 pounds per square inch up to about 6000 pounds per square inch, the most suitable pressure being more or less dependent upon the particular temperature involved. In general, the higher the pressure, the higher the yield of alkylate. Accordingly, the criterion for establishing an upper limit to the pressure range used is primarily the feasibility of maintaining such pressure.

The process may be carried out as a batch, continuous or semi-continuous type of operation. Particularly when the process is carried out on a commercial scale, economic considerations make it preferable to operate in a continuous manner. For efficient operation, whether the process is carried out on a batch or continuous basis, it is essential that the hydrocarbon reactants be intimately contacted with the homogeneous, gaseous phase alkylation catalysts. This may be effected in several ways, as is well known in the art.

In my process it is desirable, as in known isoparaffinolefin alkylation processes, to keep the concentration of the cycloparaffin reactant relatively low during the alkylation reaction, in order to eliminate secondary reactions as much as possible. Accordingly, it is advisable to maintain the concentration of the cycloparaffin reactant in the charge below about 25% by volume, and preferably, between about 2% and about 12% by volume. In continuous operation, this is effected by introducing the cycloparaffin reactant at a number of points in the reaction zone or by adding the same to a recirculating mass of excess paraffinic reactant, reaction product, and catalyst.

The reaction period during which the reactants are present in the reaction zone depends upon the temperature, and to a certain extent, upon the pressure. Ordinarily, a reaction period varying between 1–2 minutes and 1–2 hours is satisfactory.

It must be understood, that the reaction variables are more or less interdependent, hence, when one is arbitrarily fixed, the limits within which the others may be varied, are somewhat restricted. In any particular instance, the most desirable conditions can be readily ascertained by one skilled in the art, the preferred ranges of these variables having been indicated hereinbefore.

Numerous experimental data could be adduced to point out the advantages of the process of the present invention, but the following examples are sufficiently characteristic:

Mixtures of isobutane, propylene or cyclopropane, and of propylene dibromide were charged continuously under pressure to a reactor immersed in a molten lead bath to insure an even temperature throughout. The reactor consisted of a coiled ¾-inch stainless steel pipe having a capacity of about 3300 c. c. The charge was pumped into the reactor by displacement with ethylene glycol. The charging rate was controlled by regulating the pumping speed. The reaction product was released from the reaction coil through a needle valve, into a condenser, and thence, into a receiver.

The product was stabilized, depentanized and finally subjected to distillation. The triptane-containing fraction (76–86° C.) was subjected to an infra-red spectrographic analysis. The pertinent data of each run are tabulated in the following table:

*Alkylation of isobutane to produce triptane*

| Run No. | 1 | 2 |
|---|---|---|
| Temperature, °F | 850 | 845 |
| Pressure, lbs. per sq. in | 4,500 | 4,300 |
| Contact Time, minutes | 31.2 | 30+ |
| Propylene Dibromide, Per cent by Wt. of Hydrocarbon Charge | 1.0 | 1.2 |
| Cyclopropane, Per cent by Wt. of Hydrocarbon Charge | 2.8 |  |
| Propylene, Per cent by Wt. of Hydrocarbon Charge |  | 3.2 |
| Vol. Per cent of Alkylate Boiling Between 76° C. and 86° C | 41.5 | 38.0 |
| Vol. Per cent Triptane in 76–86° C. Cut of Alkylate | 11 | 6.1 |

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim:

1. The process for producing high yields of triptane, which comprises contacting isobutane with cyclopropane, in gaseous phase and in a reaction zone under alkylating conditions including temperatures varying between about 700° F. and about 940° F. and pressures of at least about 500 pounds per square inch, in the presence of a halogen derivative of a hydrocarbon, and maintaining said isobutane in excess over said cyclopropane in said reaction zone, so that alkylation is the principal reaction.

2. The process for producing high yields of triptane, which comprises contacting isobutane with cyclopropane, in gaseous phase and in a reaction zone under alkylating conditions including temperatures varying between about 800° F. and about 850° F. and pressures of at least about 2500 pounds per square inch, in the presence of a halogen derivative of a hydrocarbon, in amounts of at least about 0.5% based on the weight of said isobutane and cyclopropane, and maintaining said isobutane in excess over said cyclopropane in said reaction zone, so that alkylation is the principal reaction.

3. The process for producing high yields of triptane, which comprises contacting isobutane with cyclopropane, in gaseous phase and in a reaction zone under alkylating conditions including temperatures varying between about 700° F. and about 940° F. and pressures of at least about 500 pounds per square inch, in the presence of a chlorine derivative of a low-boiling hydrocarbon, and maintaining said isobutane in excess over said cyclopropane in said reaction zone, so that alkylation is the principal reaction.

4. The process for producing high yields of triptane, which comprises contacting isobutane with cyclopropane, in gaseous phase and in a reaction zone under alkylating conditions including temperatures varying between about 800° F. and about 850° F. and pressures of at least about 2500 pounds per square inch, in the presence of a chlorine derivative of a low-boiling hydrocarbon, in amounts of at least about 0.5% based on the weight of said isobutane and cyclopropane, and maintaining said isobutane in excess over said cyclopropane in said reaction zone, so that alkylation is the principal reaction.

5. The process for producing high yields of triptane, which comprises contacting isobutane with cyclopropane, in gaseous phase and in a reaction zone under alkylating conditions including temperatures varying between about 700° F. and about 940° F. and pressures of at least about 500 pounds per square inch, in the presence of a bromine derivative of a low-boiling hydrocarbon, and maintaining said isobutane in excess over said cyclopropane in said reaction zone, so that alkylation is the principal reaction.

6. The process for producing high yields of triptane which comprises contacting isobutane with cyclopropane, in gaseous phase and in a reaction zone under alkylating conditions including temperatures varying between about 800° F. and about 850° F. and pressures of at least about 2500 pounds per square inch, in the presence of a bromine derivative of a low-boiling hydrocarbon, in amounts of at least about 0.5% based on the weight of said isobutane and cyclopropane, and maintaining said isobutane in excess over said cyclopropane in said reaction zone, so that alkylation is the principal reaction.

7. The process for producing high yields of triptane, which comprises contacting isobutane with cyclopropane, in gaseous phase and in a reaction zone under alkylating conditions including temperatures varying between about 700° F. and about 940° F., and pressures of at least about 500 pounds per square inch, in the presence of a chlorine derivative of a low-boiling acyclic hydrocarbon, and maintaining said isobutane in excess over said cyclopropane in said reaction zone, so that alkylation is the principal reaction.

8. The process for producing high yields of triptane, which comprises contacting isobutane with cyclopropane, in gaseous phase and in a reaction zone under alkylating conditions including temperatures varying between about 800° F. and about 850° F., and pressures of at least about 2500 pounds per square inch, in the presence of a chlorine derivative of a low-boiling acyclic hydrocarbon, in amounts of at least about 0.5% based on the weight of said isobutane and cyclopropane, and maintaining said isobutane in excess over said cyclopropane in said reaction zone, so that alkylation is the principal reaction.

9. The process for producing high yields of triptane, which comprises contacting isobutane with cyclopropane, in gaseous phase and in a reaction zone under alkylating conditions including temperatures varying between about 700° F. and about 940° F., and pressures of at least about 500 pounds per square inch, in the presence of a bromine derivative of a low-boiling acyclic hydrocarbon, and maintaining said isobutane in excess over said cyclopropane in said reaction zone, so that alkylation is the principal reaction.

10. The process for producing high yields of triptane, which comprises contacting isobutane with cyclopropane, in gaseous phase and in a reaction zone under alkylating conditions including temperatures varying between about 800° F. and about 850° F., and pressures of at least about 2500 pounds per square inch, in the presence of a bromine derivative of a low-boiling acyclic hydrocarbon, in amounts of at least about 0.5% based on the weight of said isobutane and cyclopropane, and maintaining said isobutane in excess over said cyclopropane in said reaction zone, so that alkylation is the principal reaction.

WILLIAM A. STOVER.

REFERENCES CITED

The following references are of record in the file of this patent:

UNITED STATES PATENTS

| Number | Name | Date |
|---|---|---|
| 2,410,072 | Horton et al. | Oct. 29, 1946 |
| 2,410,107 | Sachanene et al. | Oct. 29, 1946 |

FOREIGN PATENTS

| Number | Country | Date |
|---|---|---|
| 498,260 | Great Britain | Jan. 5, 1939 |
| 830,037 | France | Nov. 26, 1937 |

Certificate of Correction

May 3, 1949.

Patent No. 2,469,344.

WILLIAM A. STOVER

It is hereby certified that errors appear in the printed specification of the above numbered patent requiring correction as follows:

Column 3, line 67, after "trimethylbutane" insert the word *or*; column 4, line 68, for "cyclic com-" read *cyclic oxygen com-*;

and that the said Letters Patent should be read with these corrections therein that the same may conform to the record of the case in the Patent Office.

Signed and sealed this 15th day of November, A. D. 1949.

[SEAL]

THOMAS F. MURPHY,
*Assistant Commissioner of Patents.*